United States Patent
Akita et al.

(10) Patent No.: US 8,989,659 B2
(45) Date of Patent: Mar. 24, 2015

(54) WIRELESS COMMUNICATION DEVICE, POWER TRANSMITTER, AND IC CARD DEVICE

(75) Inventors: Koji Akita, Yokohama (JP); Takayoshi Ito, Yokohama (JP); Masashi Suzuki, Yokosuka (JP); Hiroyasu Uchida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 13/608,906

(22) Filed: Sep. 10, 2012

(65) Prior Publication Data

US 2013/0137369 A1    May 30, 2013

(30) Foreign Application Priority Data

Nov. 28, 2011  (JP) .................................. 2011-259464

(51) Int. Cl.
*H04B 5/00*    (2006.01)
*H04B 7/00*    (2006.01)

(52) U.S. Cl.
CPC ............ *H04B 5/0031* (2013.01); *H04B 5/0037* (2013.01); *H04B 5/0081* (2013.01); *Y02B 60/50* (2013.01)
USPC ........ 455/41.1; 455/41.2; 455/552.1; 455/572

(58) Field of Classification Search
CPC .......... H04B 5/00; H04B 5/02; H04B 5/0081; H04M 1/7253; H04W 88/06; G06F 1/3206; G06F 1/3212
USPC .................. 455/41.1, 41.2, 552.1, 553.1, 572
See application file for complete search history.

(56) References Cited

U.S. PATENT DOCUMENTS 5,757,921 A * 5/1998 Okanobu et al. ............ 455/550.1
7,181,164 B2 * 2/2007 Lee et al. ...................... 455/41.2
(Continued)

FOREIGN PATENT DOCUMENTS

CN        1764118 A      4/2006
CN      101827434 A      9/2010
(Continued)

OTHER PUBLICATIONS

Chinese Office Action dated Sep. 3, 2014 in counterpart Chinese Application No. 201210388354.9.
(Continued)

*Primary Examiner* — Quochien B Vuong
(74) *Attorney, Agent, or Firm* — Holtz, Holtz, Goodman & Chick PC

(57) ABSTRACT

A wireless communication device has a power receiving wireless communication unit configured to receive power and perform wireless communication utilizing the power, a storage unit configured to store a portion of the power, and a first wireless communication unit configured to perform wireless communication faster and more efficiently than the power receiving wireless communication unit by utilizing the power stored in the storage unit, when amount of the power stored in the storage unit exceeds a first reference level. The power receiving wireless communication unit includes a power receiver configured to receive power and supply a portion of the power to the storage unit, and a second wireless communication unit configured to perform wireless communication slower and less efficiently than the first wireless communication unit by utilizing the power received by the power receiver.

19 Claims, 10 Drawing Sheets

(56) References Cited

U.S. PATENT DOCUMENTS

| | | |
|---|---|---|
| 7,336,929 B2 * | 2/2008 | Yasuda et al. ............... 455/41.2 |
| 7,848,776 B2 * | 12/2010 | Akiba et al. ............... 455/552.1 |
| 7,948,925 B2 | 5/2011 | Miyabayashi et al. |
| 8,126,433 B2 * | 2/2012 | Haartsen ...................... 455/411 |
| 8,744,520 B2 | 6/2014 | Maeda |
| 2010/0068996 A1 | 3/2010 | Haartsen |
| 2011/0035608 A1 | 2/2011 | Aoki |

FOREIGN PATENT DOCUMENTS

| | | |
|---|---|---|
| JP | 2009-218845 A | 9/2009 |
| JP | 2009253551 A | 10/2009 |

OTHER PUBLICATIONS

Japanese Office Action dated Jan. 6, 2015, issued in counterpart Japanese Application No. 2011-259464.

* cited by examiner

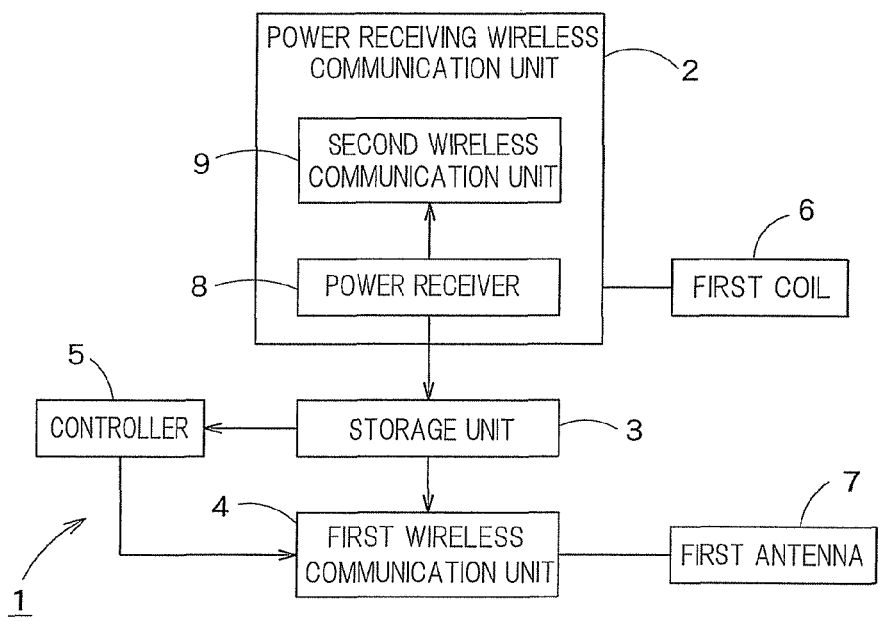
F I G. 1
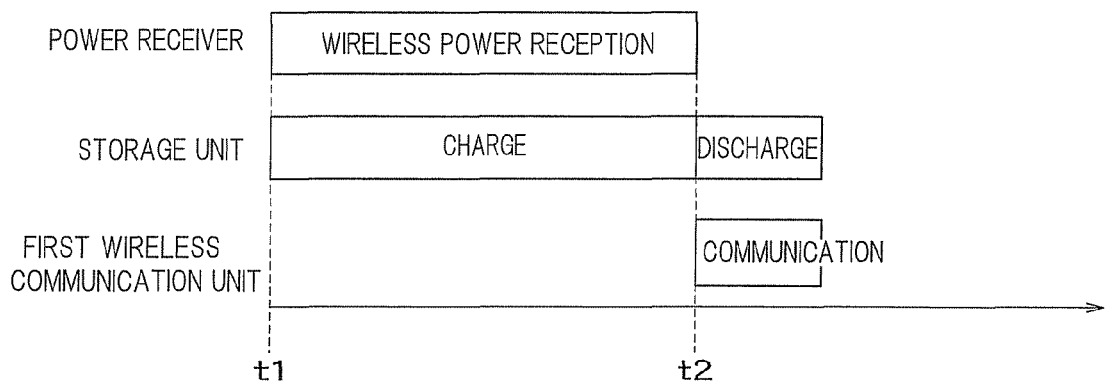
F I G. 2

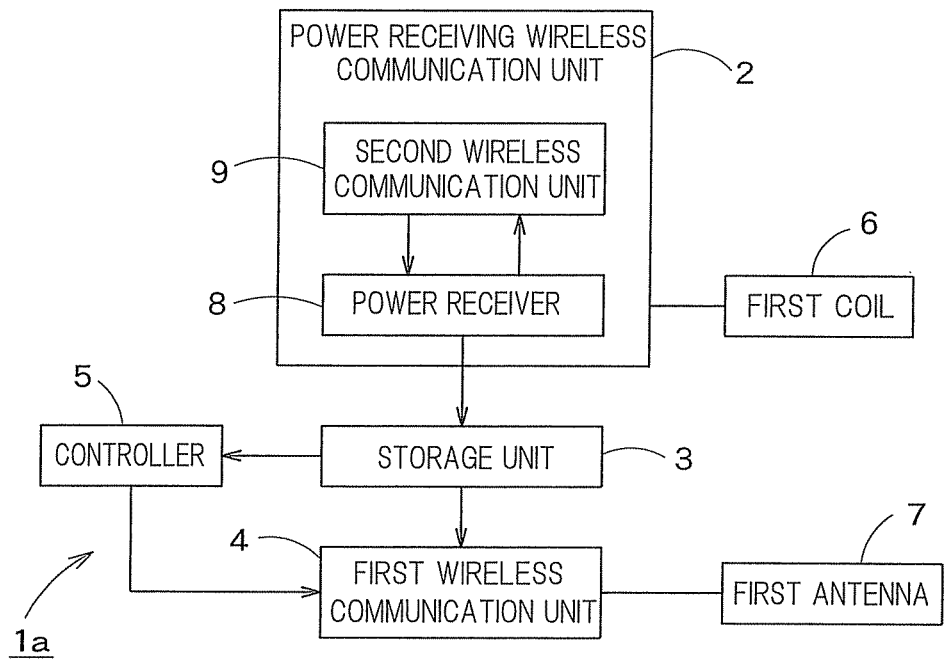
F I G. 4
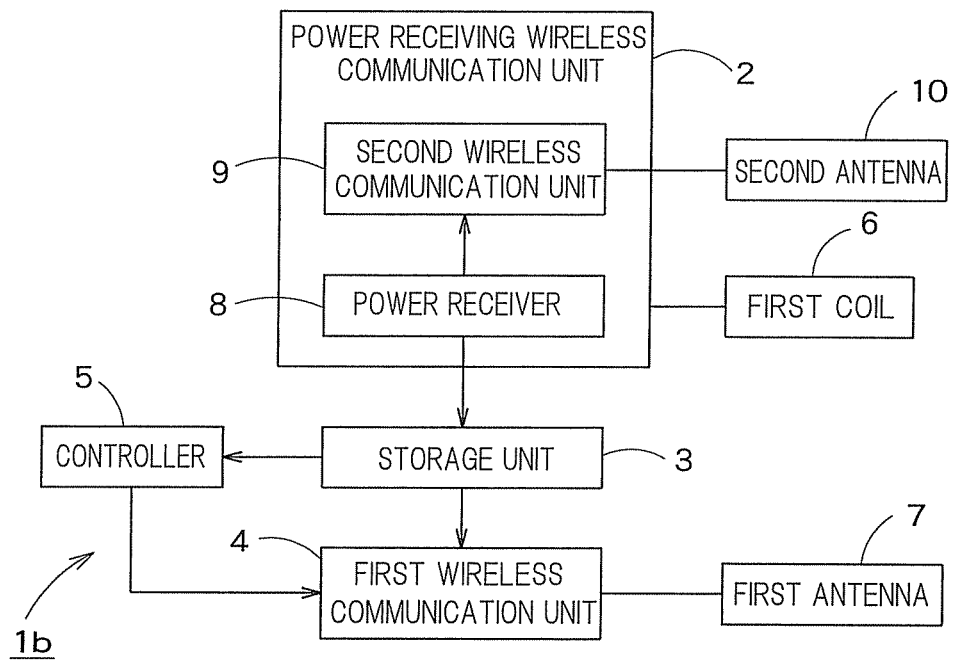
F I G. 5

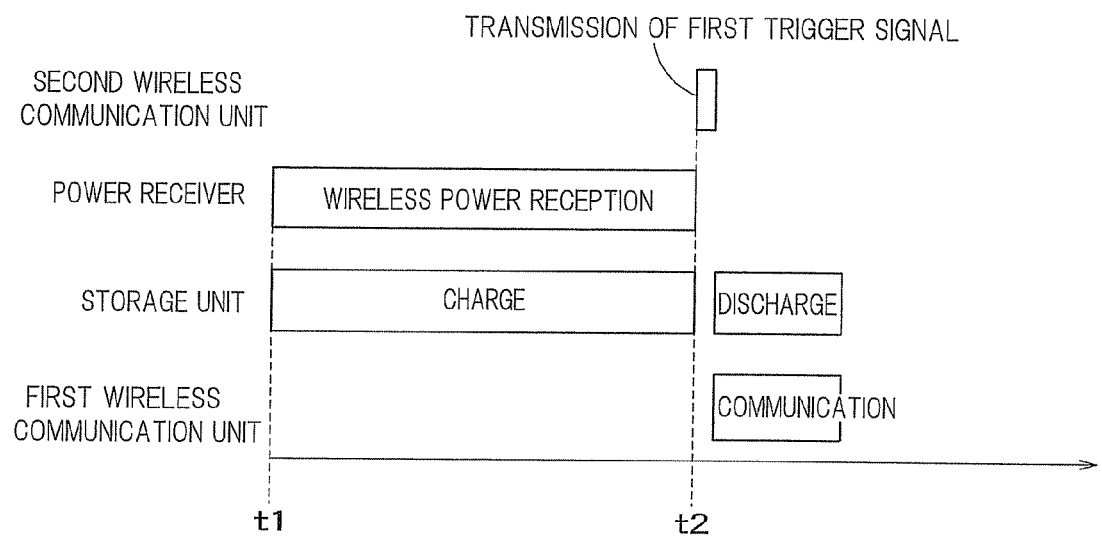
F I G. 6

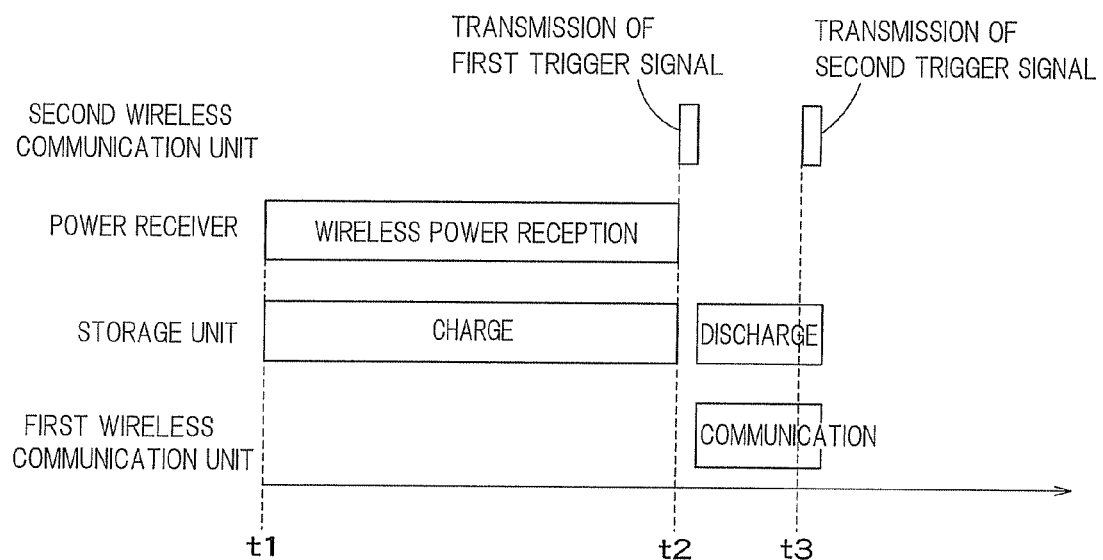
F I G. 8

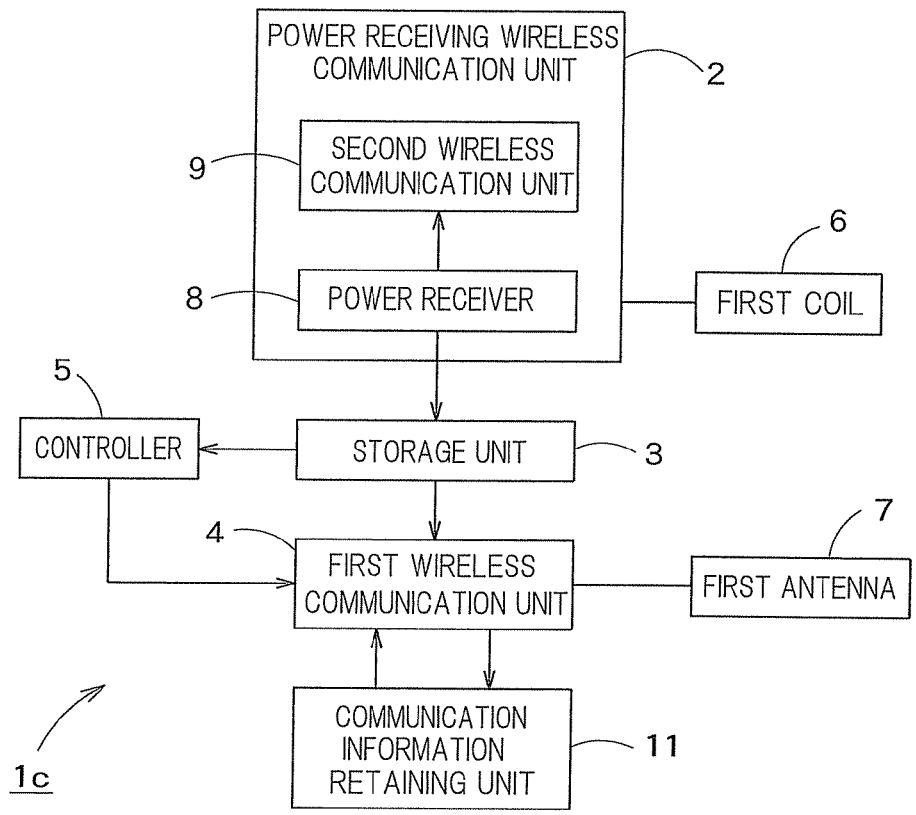
F I G. 10
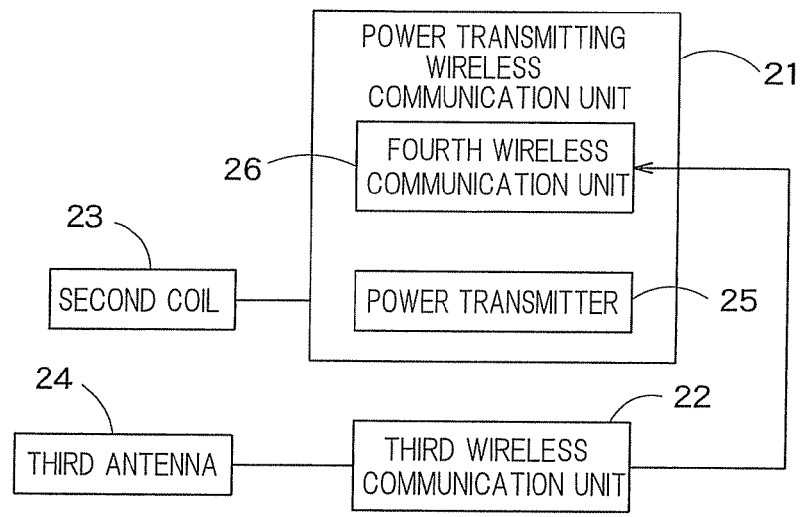
F I G. 11

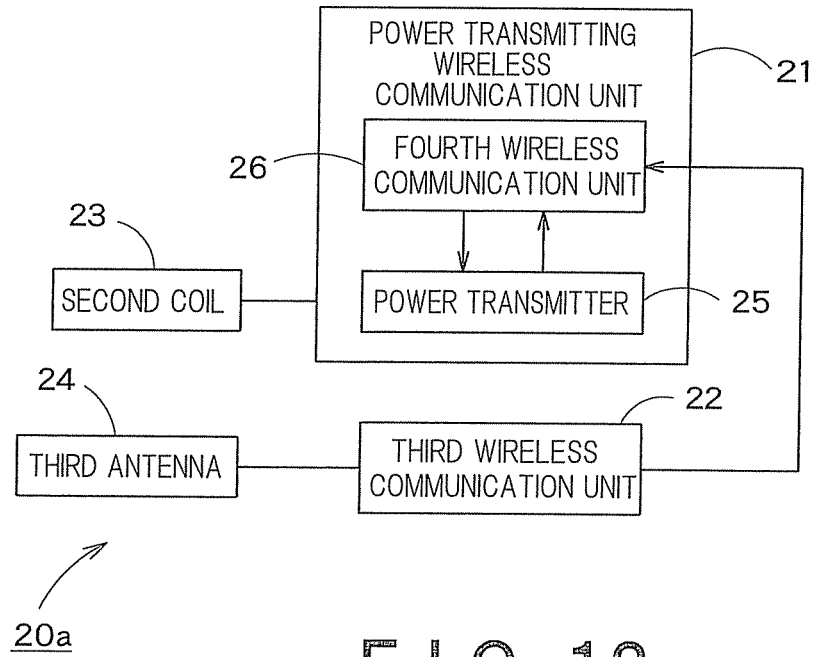
F I G. 12
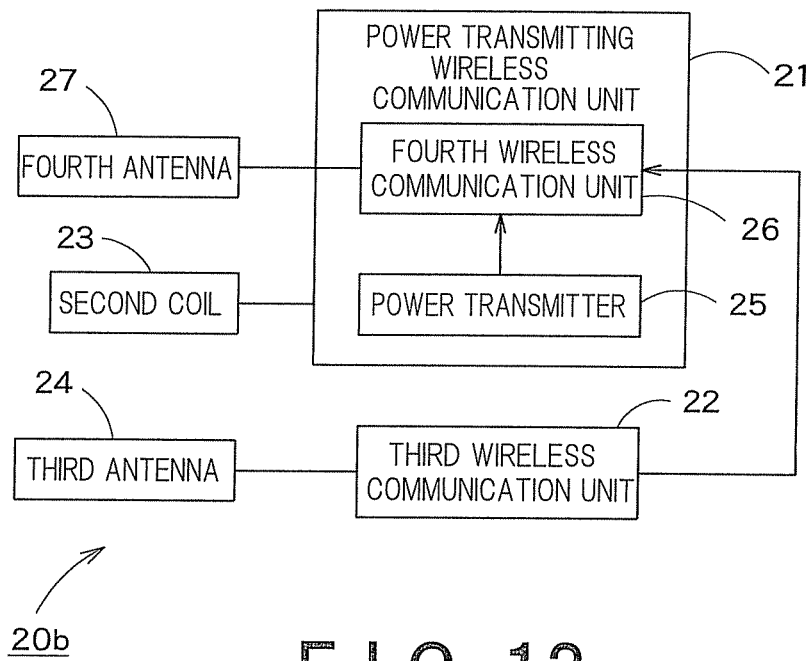
F I G. 13

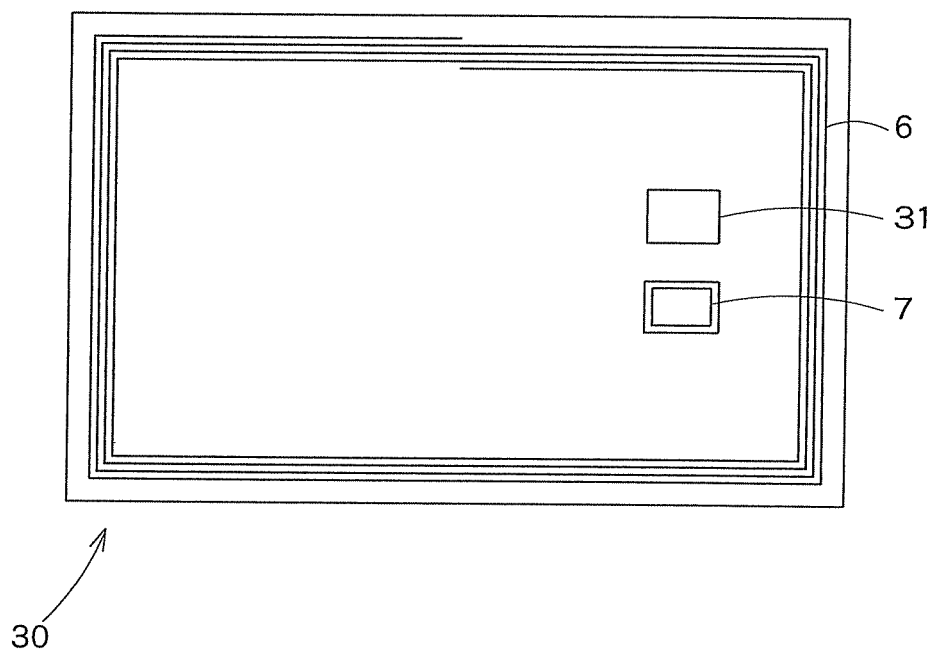
F I G. 14

WIRELESS COMMUNICATION DEVICE, POWER TRANSMITTER, AND IC CARD DEVICE

CROSS REFERENCE TO RELATED APPLICATIONS

This application is based upon and claims the benefit of priority from the prior Japanese Patent Application No. 2011-259464, filed on Nov. 28, 2011, the entire contents of which are incorporated herein by reference.

FIELD

Embodiments of the present invention relate to a wireless communication device for performing wireless communication utilizing power received thereby, a power transmitter, and to an IC card device.

BACKGROUND

In NFC (Near Field Communication) such as Felica (registered trademark), electromagnetic induction occurring in a coil is used to perform communication, which is sometimes called close-proximity wireless communication or noncontact wireless communication. Hereinafter, such communication is referred to as noncontact wireless communication. One characteristic of noncontact wireless communication is to supply electric power through electromagnetic induction and to use the electric power for wireless communication. Therefore, noncontact wireless communication has an advantage that it can be applied to a device (such as a card-type device) which has no power-supply unit in the device, but there is a problem that the speed of noncontact wireless communication is slow and thus it takes a long time to transfer large-volume data.

As a technique to solve this problem, there has been proposed a technique in which noncontact wireless communication is combined with high-speed wireless communication. This technique intends to improve communication speed by establishing connection using noncontact wireless communication and performing the subsequent communication with high-speed wireless communication. However, since high-speed wireless communication generally consumes a large amount of power, there is a likelihood that power supplied through noncontact wireless communication is not enough to stably perform high-speed wireless communication.

BRIEF DESCRIPTION OF THE DRAWINGS

FIG. 1 is a block diagram showing a schematic configuration of a wireless communication device 1 according to a first embodiment.

FIG. 2 is an operation timing diagram of the wireless communication device 1 of FIG. 1.

FIG. 4 is a block diagram showing a schematic configuration of a wireless communication device is according to a second embodiment.

FIG. 5 is a block diagram showing a schematic configuration of a wireless communication device 1b according to a third embodiment.

FIG. 6 is an operation timing diagram of a wireless communication device 1 according to a fourth embodiment.

FIG. 8 is an operation timing diagram when a second trigger signal is used.

FIG. 10 is a block diagram showing a schematic configuration of a wireless communication device is according to a fifth embodiment.

FIG. 11 is a block diagram showing a schematic configuration of a power transmitter 20.

FIG. 12 is a more concrete block diagram of the power transmitter 20 of FIG. 11.

FIG. 13 is a block diagram showing a modification example derived from FIG. 12.

FIG. 14 is a diagram showing an example of an IC card 30 having the wireless communication device 1 according to the first to sixth embodiments.

DETAILED DESCRIPTION

Figure 3:
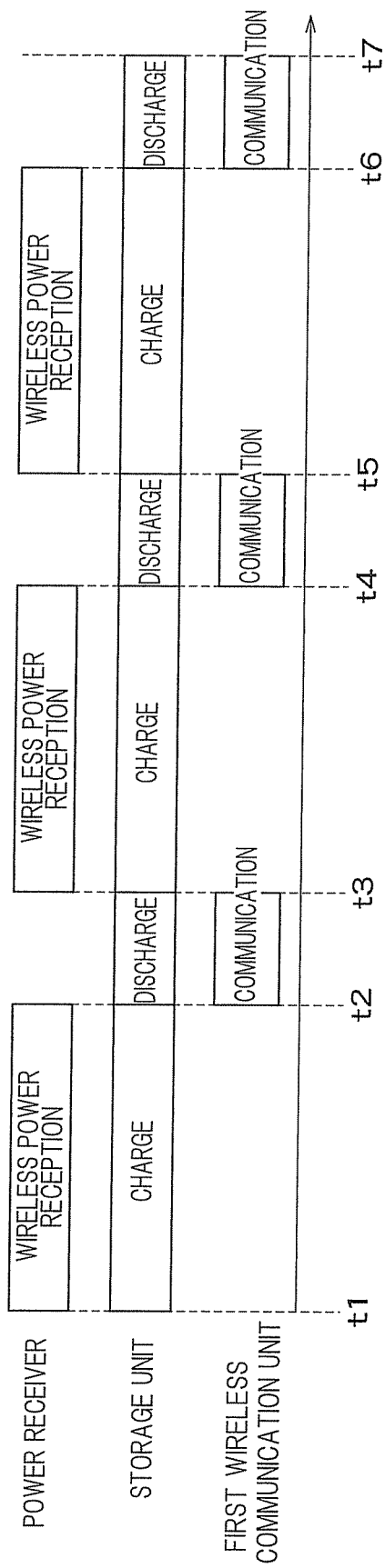
FIG. 3 is an operation timing diagram of the wireless communication device 1 of FIG. 1 when being observed for a longer period of time compared to FIG. 2.

According to one embodiment of the present invention, a wireless communication device has a power receiving wireless communication unit configured to receive power and perform wireless communication utilizing the power, a storage unit configured to store a portion of the power received by the power receiving wireless communication unit, and a first wireless communication unit configured to perform wireless communication faster and more efficiently than the power receiving wireless communication unit by utilizing the power stored in the storage unit, when amount of the power stored in the storage unit exceeds a first reference level. The power receiving wireless communication unit includes a power receiver configured to receive the power and supply a portion of the power to the storage unit, and a second wireless communication unit configured to perform wireless communication slower and less efficiently than the first wireless communication unit by utilizing the power received by the power receiver.

Embodiments will now be explained with reference to the accompanying drawings.

First Embodiment

FIG. 1 is a block diagram showing a schematic configuration of a wireless communication device 1 according to a first embodiment. The wireless communication device 1 of FIG. 1 has a power receiving wireless communication unit 2 which performs wireless communication utilizing the received power received, a storage unit 3 which stores a portion of the received power, a first wireless communication unit 4 which performs wireless communication faster and more efficiently than the power receiving wireless communication unit 2 by utilizing the portion of the power stored in the storage unit 3, when amount of the power stored in the storage unit 3 exceeds a first reference level, a controller 5 which controls the storage unit 3 and the first wireless communication unit 4, a first coil 6 which is connected to the power receiving wireless communication unit 2, and a first antenna 7 which is connected to the first wireless communication unit 4. As long as the first wireless communication unit 4 has the capability of performing wireless communication faster and more efficiently than the power receiving wireless communication unit 2, the first wireless communication unit 4 may perform wireless communication slower or less efficiently than the power receiving wireless communication unit 2.

Here, the term "fast" means that a certain size of data can be transmitted in a short time, namely at a high data rate. Generally, the term "fast" means that the unit expressed by bps (Bit Per Sec) is large. The term "highly efficient" means that a certain size of data can be transmitted with less power consumption, which means that efficiency of power consumption required for communication is excellent. Generally, the term "highly efficient" means that the unit expressed by 3/bit (Joule per bit) is small.

The power receiving wireless communication unit 2 has a power receiver 8 and a second wireless communication unit 9. The power receiver 8 supplies, to the storage unit 3, a portion of power received by the first coil 6 through electromagnetic induction. The second wireless communication unit 9 performs wireless communication slower and less efficiently than the first wireless communication unit 4 by utilizing the portion of the power received by the power receiver 8.

The fast and highly efficient wireless communication performed by the first wireless communication unit 4 is typified by millimeter-band wireless communication, TransferJet (registered trademark), wireless LAN, Bluetooth (registered trademark), etc., and a concrete wireless method should not be limited thereto. Further, the slow and less efficient wireless communication performed by the second wireless communication unit 9 is NFC such as Felica. As long as the second wireless communication unit 9 performs wireless communication slower and less efficiently than the first wireless communication unit 4, any wireless method can be utilized as a concrete method.

FIG. 2 is an operation timing diagram of the wireless communication device 1 of FIG. 1. In FIG. 2, the horizontal axis represents time, while the vertical axis represents the name of each component operating in the wireless communication device 1. As shown in FIG. 2, at Time t1, the power receiver 8 starts receiving power, and the storage unit 3 correspondingly starts receiving and storing the power. At Time t2, the amount of the power stored in the storage unit 3 exceeds the first reference level.

Accordingly, the first wireless communication unit 4 starts fast and highly efficient wireless communication utilizing the power stored in the storage unit 3.

The controller 5 continuously monitors the amount of the power stored in the storage unit 3. When the first wireless communication unit 4 has started wireless communication, and then the amount of the power stored in the storage unit 3 falls to a second reference level or less, the controller 5 stops wireless communication by the first wireless communication unit 4, and does not allow the first wireless communication unit 4 to restart wireless communication until the amount of the power exceeds the first reference level again. Therefore, the first wireless communication unit 4 performs wireless communication intermittently.

FIG. 3 is an operation timing diagram of the wireless communication device 1 of FIG. 1 operated at an time interval longer than that of FIG. 2.

As shown in FIG. 3, only while the amount of the power stored in the storage unit 3 exceeds the first reference level (t2 to t3, t4 to t5, t6 to t7), the first wireless communication unit 4 wirelessly communicates with a power transmitter (not shown). During these periods, the storage unit 3 discharges, and during a period other than these periods, the storage unit 3 is charged by storing the power received by the power receiver 8. The storage unit 3 may keep discharging while simultaneously receiving and storing the power from the power receiver 8. This leads to an advantage that communication can be maintained for a longer period of time.

As stated above, the wireless communication device in the first embodiment has the first wireless communication unit 4 which performs fast and highly efficient wireless communication, the second wireless communication unit 9 which performs wireless communication slower and less efficiently than the first wireless communication unit 4, the power receiver 8 which receives power obtained by the first coil 6 through electromagnetic induction, and the storage unit 3 which stores the portion of the received power. Since the first wireless communication unit 4 is used only while the amount of the power stored in the storage unit 3 exceeds the first reference level, there is no likelihood that the wireless communication using the first wireless communication unit 4 becomes unstable due to power shortage. For example, when it is required to transmit large-volume data, the first wireless communication unit 4 operates intermittently and transmits the data on several occasions. In this way, large-volume data can be transmitted without any trouble.

That is, in the first embodiment, only while the first wireless communication unit 4 capable of performing fast and highly efficient wireless communication is supplied with sufficient power, the first wireless communication unit 4 is driven, thereby performing fast and highly efficient wireless communication while fully utilizing the potential of the first wireless communication unit 4.

Further, the wireless communication device in the first embodiment has the second wireless communication unit 9 which performs wireless communication slower and less efficiently than the first wireless communication unit 4. Since the second wireless communication unit 9 continuously performs wireless communication utilizing the power received by the power receiver 8, slow wireless communication for transmitting small-volume data can be continuously performed. Further, even while wireless communication using the first wireless communication unit 4 is stopped, wireless communication using the second wireless communication unit 9 can be continuously performed.

Second Embodiment

A second embodiment is a first concrete example derived from the first embodiment.

FIG. 4 is a block diagram showing a schematic configuration of a wireless communication device 1a according to the second embodiment. In the wireless communication device 1a of FIG. 4, the same reference numerals are given to components common to those in FIG. 1, and differences therebetween will be mainly explained.

The wireless communication device 1a of FIG. 4 is different from FIG. 1 in that the power receiver 8 in the power receiving wireless communication unit 2 is connected to the first coil 6, and that the power receiver 8 and the second wireless communication unit 9 transmit and receive signals to and from each other.

The power receiver 8 of FIG. 4 receives an RF signal transmitted from the power transmitter (not shown) through the first coil 6. Further, the second wireless communication unit 9 of FIG. 4 transmits an RF signal to the power transmitter by utilizing the first coil 6. More specifically, the second wireless communication unit 9 generates a new RF signal by modulating the amplitude of a constant modulus signal included in the RF signal received by the first coil 6, and transmits the new RF signal to the power transmitter through the first coil 6.

Since the power receiver 8 and the second wireless communication unit 9 wirelessly communicate with the power transmitter through electromagnetic induction occurring in the first coil 6, wireless communication can be performed only when the wireless communication device 1a of FIG. 4 is placed in a close distance to the power transmitter. Therefore, it is assumed that the wireless communication device 1a and the power transmitter wirelessly communicate with each other utilizing electromagnetic induction such as NFC.

As stated above, in the second embodiment, both of the power receiver 8 and the second wireless communication unit 9 in the power receiving wireless communication unit 2 wirelessly communicate with the power transmitter through electromagnetic induction occurring in the first coil 6. Accordingly, it is unnecessary for the power receiver 8 and the second wireless communication unit 9 to separately provide the respective antennas and coils, thereby simplifying and downsizing the internal configuration of the wireless communication device 1a.

Third Embodiment

A third embodiment is a second concrete example derived from the first embodiment.

FIG. 5 is a block diagram showing a schematic configuration of a wireless communication device 1b according to the third embodiment. In the wireless communication device 1b of FIG. 5, the same reference numerals are given to components common to those in FIG. 1, and differences therebetween will be mainly explained.

The wireless communication device 1b of FIG. 5 is similar to FIG. 4 in that the power receiver 8 in the power receiving wireless communication unit 2 is connected to the first coil 6, but different from FIG. 4 in that the second wireless communication unit 9 is connected to a second antenna 10.

The second wireless communication unit 9 utilizes the portion of the power received by the power receiver 8 through electromagnetic induction using the first coil 6, in order to transmit an RF signal to the power transmitter (not shown) through the second antenna 10, and receives an RF signal transmitted from the power transmitter through the second antenna 10.

As stated above, in the third embodiment, the second wireless communication unit 9 wirelessly communicates with the power transmitter through the second antenna 10 arranged separately from the first coil 6. Accordingly, even when the power transmitter is placed beyond a distance in which electromagnetic induction can occur, wireless communication can be stably performed as long as power is stored in the storage unit 3.

Fourth Embodiment

A fourth embodiment is characterized in notifying the power transmitter and the first wireless communication unit 4 that the amount of the power stored in the storage unit 3 has exceeded the first reference level.

The internal configuration of the wireless communication device 1 according to the fourth embodiment may be based on any one of FIGS. 1, 4, and 5 explained above. The controller 5 in the wireless communication device 1 continuously monitors the amount of the power stored in the storage unit 3, and when the amount of the power exceeds the first reference level, the controller 5 generates a first trigger signal and supplies it to the second wireless communication unit 9. The second wireless communication unit 9 transmits an RF signal including the first trigger signal to the power transmitter (not shown) and the first wireless communication unit 4. At this time, the second wireless communication unit 9 uses the first coil 6 in the configuration of FIG. 4, and uses the second antenna 10 in the configuration of FIG. 5, to transmit the above RF signal including the first trigger signal to the power transmitter.

When the power transmitter receives this first trigger signal, it knows that preparation for wirelessly communicating with the first wireless communication unit 4 is ready. Similarly, when the first wireless communication unit 4 receives the first trigger signal from the controller 5, it knows that the power stored in the storage unit 3 is sufficient enough to wirelessly communicate with the power transmitter. Then, the power transmitter and the first wireless communication unit 4 start wirelessly communicating with each other.

FIG. 6 is an operation timing diagram of the wireless communication device 1 according to the fourth embodiment. At Time t1, the power receiver 8 starts receiving power from the power transmitter, and starts storing the received power in the storage unit 3. At Time t2, the controller 5 detects that the amount of the power stored in the storage unit 3 has exceeded the first reference level, and generates a first trigger signal. This first trigger signal is transmitted to the power transmitter through the second wireless communication unit 9, and is also transmitted to the first wireless communication unit 4. Then, the first wireless communication unit 4 starts wirelessly communicating with the power transmitter.

Figure 7:
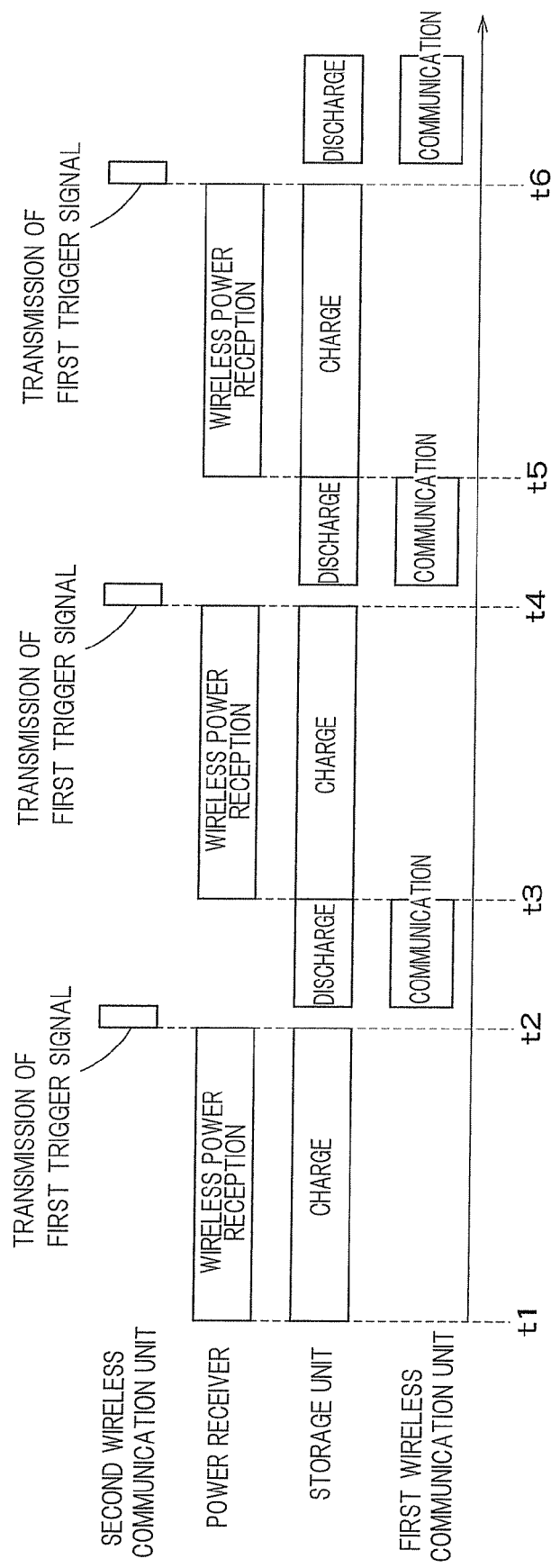
FIG. 7 is an operation timing diagram of the wireless communication device 1 according to the fourth embodiment when being observed for a longer period of time compared to FIG. 2.

FIG. 7 is an operation timing diagram of the wireless communication device 1 according to the fourth embodiment, in which the observed time period is longer than FIG. 2. As shown in FIG. 7, the first wireless communication unit 4 and the power transmitter wirelessly communicate with each other only for a predetermined period after receiving the first trigger signal. This predetermined period is a period for which the amount of the power stored in the storage unit 3 is not at the second reference level or less. In this way, only when the first trigger signal is received, the first wireless communication unit 4 and the power transmitter wirelessly communicate with each other intermittently. Therefore, even when it is required to transmit/receive large-volume data, it is possible to transmit/receive the large-volume data in a relatively short time by intermittently performing wireless communication between the first wireless communication unit 4 and the power transmitter.

Actually, the first wireless communication unit 4 and the power transmitter cannot correctly judge whether the amount of the power stored in the storage unit 3 has fallen to the second reference level or less, by using only the first trigger signal. Accordingly, the controller 5 generates a second trigger signal when the amount of the power stored in the storage unit 3 has fallen to the second reference level or less. This second trigger signal may be transmitted not only to the power transmitter through the second wireless communication unit 9, but also to the first wireless communication unit 4.

FIG. 8 is an operation timing diagram when the second trigger signal is used. As shown in FIG. 8, at Time t1, the controller 5 detects that the amount of the power stored in the storage unit 3 has exceeded the first reference level, and generates a first trigger signal. Upon receiving this first trigger signal, the first wireless communication unit 4 and the power transmitter start wirelessly communicating with each other. After that, at Time t2, the controller 5 detects that the amount of the power stored in the storage unit 3 has fallen to the second reference level or less, and generates a second trigger signal. Upon receiving this second trigger signal, the first wireless communication unit 4 and the power transmitter stop wirelessly communicating with each other.

Figure 9:
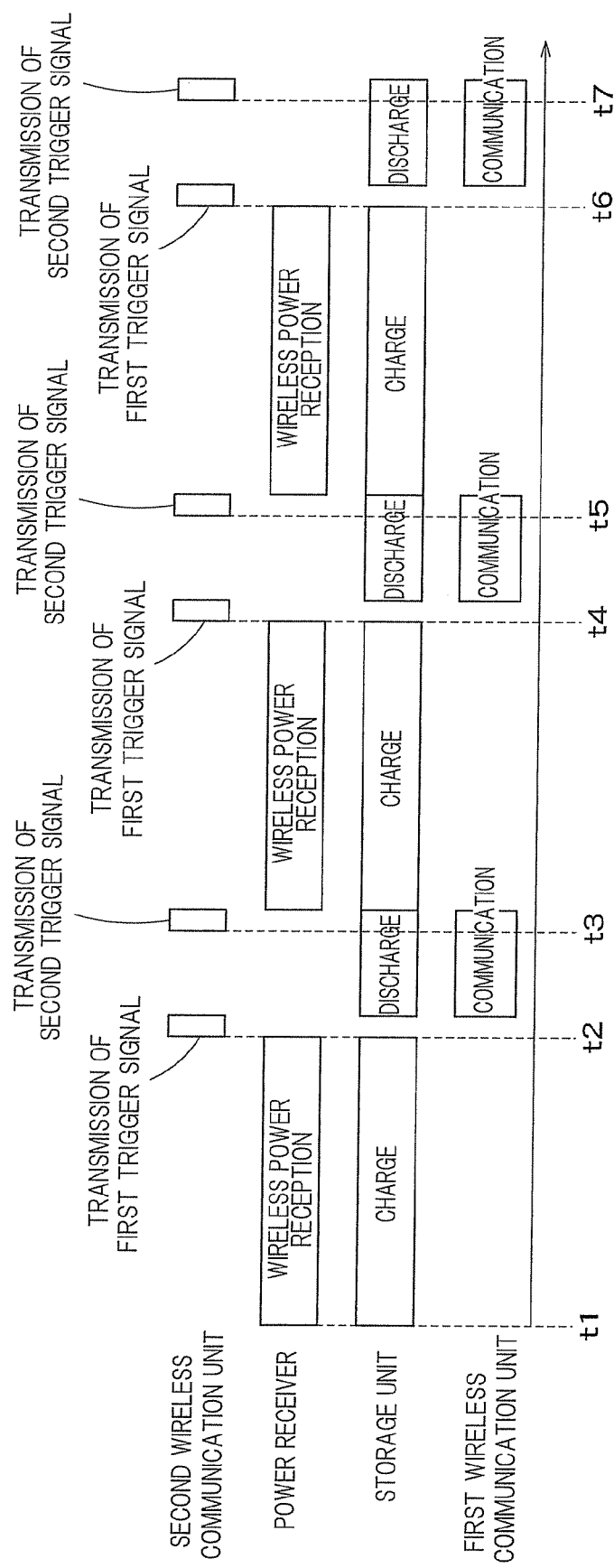
FIG. 9 is an operation timing diagram of the wireless communication device 1 according to the fourth embodiment when being observed for a longer period of time compared to FIG. 8.

FIG. 9 is an operation timing diagram of the wireless communication device 1 according to the fourth embodiment, in which the observed time period is longer than FIG. 8. As shown in FIG. 9, the first wireless communication unit 4 and the power transmitter wirelessly communicate with each other only during the period after receiving the first trigger signal and until receiving the second trigger signal. In this way, the first wireless communication unit 4 performs fast and highly efficient wireless communication only while the amount of the power stored in the storage unit 3 exceeds the first reference level, thereby stably performing high-speed communication.

As stated above, in the fourth embodiment, when the amount of the power stored in the storage unit 3 has exceeded the first reference level, a first trigger signal is generated and transmitted to the first wireless communication unit 4 and the power transmitter, which makes it possible for the first wireless communication unit 4 and the power transmitter to accurately know the timing for starting wireless communication, without wasting power consumption. In addition, when the amount of the power stored in the storage unit 3 has fallen to the second reference level or less, a second trigger signal is generated and transmitted to the first wireless communication unit 4 and the power transmitter, which makes it possible for the first wireless communication unit 4 and the power transmitter to accurately know the timing for stopping wireless communication. Accordingly, there is no likelihood that the first wireless communication unit 4 maintains wireless communication although less power is stored in the storage unit 3, which improves the stability of wireless communication.

Fifth Embodiment

A fifth embodiment is characterized in previously retaining information required for a connection process which should be performed before the first wireless communication unit 4 starts wirelessly communicating with the power transmitter.

FIG. 10 is a block diagram showing a schematic configuration of a wireless communication device 1c according to the fifth embodiment.

In the wireless communication device 1c of FIG. 10, the same reference numerals are given to components common to those in FIG. 1, and differences therebetween will be mainly explained.

In addition to the components of FIG. 1, the wireless communication device 1c of FIG. 10 has a communication information retaining unit 11. The communication information retaining unit 11 retains at least one type of information selected from information for identifying the first wireless communication unit 4, information concerning communication performance of the first wireless communication unit 4, and standard correspondence information of the first wireless communication unit 4.

The information retained by the communication information retaining unit 11 is required for a connection process which should be performed before the first wireless communication unit 4 starts wirelessly communicating with the power transmitter. Since the first wireless communication unit 4 cannot wirelessly communicate with the power transmitter during the connection process, if it takes a long time for the connection process, the capability of the first wireless communication unit 4, i.e., performing fast and highly efficient wireless communication, cannot be fully utilized. Accordingly, in the present embodiment, time required for the connection process is shortened by previously retaining the information required for the connection process to the communication information retaining unit 11.

More concretely, at the timing when high-speed communication with the power transmitter becomes available, the first wireless communication unit 4 performs the connection process by reading, from the communication information retaining unit 11, the information required for the connection with the power transmitter, and after completing the connection process, the first wireless communication unit 4 starts performing high-speed communication with the power transmitter.

As stated above, in the fifth embodiment, the communication information retaining unit 11 arranged in the wireless communication device is retains at least a part of information required for connecting the first wireless communication unit 4 and the power transmitter, which makes it possible to shorten the time required for connecting the first wireless communication unit 4 and the power transmitter. In this way, wireless communication can be started quickly.

Sixth Embodiment

In the first to fifth embodiments, the internal configuration of the wireless communication device 1 has been explained. Hereinafter, explanation will be given on the configuration of a power transmitter which transmits power to and wirelessly communicates with the wireless communication device 1.

FIG. 11 is a block diagram showing a schematic configuration of a power transmitter 20. The power transmitter 20 of FIG. 11 has a power transmitting wireless communication unit 21 which transmits power to the wireless communication device 1 to wirelessly communicate with the wireless communication device 1, a third wireless communication unit 22 which performs fast and highly efficient wireless communication with the wireless communication device 1, a second coil 23 which is connected to the power transmitting wireless communication unit 21, and a third antenna 24 which is connected to the third wireless communication unit 22.

The power transmitting wireless communication unit 21 has a power transmitter 25 and a fourth wireless communication unit 26. The power transmitter 25 transmits power through electromagnetic induction occurring in the second coil 23.

The third wireless communication unit 22 performs fast and highly efficient wireless communication with the first wireless communication unit 4 in the wireless communication device 1. The fourth wireless communication unit 26 performs slow and less efficient wireless communication with the second wireless communication unit 9 in the wireless communication device 1.

Each of FIGS. 12 and 13 is a more concrete block diagram of the power transmitter 20 of FIG. 11.

In each of FIGS. 12 and 13, the same reference numerals are given to components common to those in FIG. 11, and differences therebetween will be mainly explained.

In a power transmitter 20a of FIG. 12, the power transmitter 25 in the power transmitting wireless communication unit 21 is connected to the second coil 23. The power transmitter 25 transmits an RF signal to the wireless communication device 1 through electromagnetic induction occurring in the second coil 23. The power receiver 8 in the wireless communication device 1 extracts power from the RF signal transmitted by the power transmitter 25.

The fourth wireless communication unit 26 generates a new RF signal by modulating the amplitude of the RF signal transmitted by the power transmitter 25, and transmits the new RF signal to the power receiver 8 through the second coil 23.

The third wireless communication unit 22 performs fast and highly efficient wireless communication with the first wireless communication unit 4 in the wireless communication device 1.

As stated above, in FIG. 12, only the second coil 23 is used when the power transmitting wireless communication unit 21 in the power transmitter 20a transmits power and performs wireless communication through the fourth wireless communication unit 26. Accordingly, there is no need to separately arrange an antenna for the fourth wireless communication unit 26, which makes it possible to simplify and downsize the configuration of the power transmitter 20.

Note that since the wireless communication is performed using electromagnetic induction occurring in the second coil 23, the wireless communication device 1 should be placed in a close distance to the power transmitter 20a to perform communication utilizing electromagnetic induction, as in the case of NFC.

On the other hand, a power transmitter 20b of FIG. 13 is different from FIG. 12 in that a fourth antenna 27 is arranged for the fourth wireless communication unit 26. The fourth wireless communication unit 26 uses the fourth antenna 27 to wirelessly communicate with the second wireless communication unit 9 in the wireless communication device 1. As long as the fourth antenna 27 is used, the fourth wireless communication unit 26 can wirelessly communicate with the second wireless communication unit 9 which is located in a distance greater than that required for NFC communication. Therefore, in the power transmitter 20b of FIG. 13, the communication distance of the fourth wireless communication unit 26 can be wider than that of the power transmitter 20a of FIG. 12, thereby improving usability.

As explained in the fourth embodiment, when the second wireless communication unit 9 in the wireless communication device 1 transmits an RF signal including the first trigger signal, the fourth wireless communication unit 26 of FIGS. 12 and 13 receives this first trigger signal to know that the amount of the power stored in the storage unit 3 in the wireless communication device 1 has exceeded the first reference level, and then instructs the third wireless communication unit 22 to perform wireless communication. Based on this instruction, the third wireless communication unit 22 performs fast and highly efficient wireless communication with the first wireless communication unit 4 in the wireless communication device 1.

Similarly, when the second wireless communication unit 9 in the wireless communication device 1 transmits an RF signal including the second trigger signal, the fourth wireless communication unit 26 of FIGS. 12 and 13 receives this second trigger signal to know that the amount of the power stored in the storage unit 3 in the wireless communication device 1 has fallen to the second reference level or less, and then instructs the third wireless communication unit 22 to stop wireless communication. Based on this instruction, the third wireless communication unit 22 stops wirelessly communicating with the first wireless communication unit 4 in the wireless communication device 1.

As stated above, in the sixth embodiment, the power transmitting wireless communication unit 21 and the third wireless communication unit 22 are arranged in the power transmitter 20 corresponding to the internal configuration of the wireless communication device 1 according to the first to fifth embodiments, which makes it possible to continuously perform slow and less efficient wireless communication by the fourth wireless communication unit 26 in the power transmitting wireless communication unit 21 while intermittently performing fast and highly efficient wireless communication by the third wireless communication unit 22. Accordingly, slow and less efficient wireless communication can be performed in parallel with fast and highly efficient wireless communication with a simple configuration, restraining power consumption.

Another Modification Example

The wireless communication device 1 in the first to fifth embodiments may be realized as a card such as an IC card. FIG. 14 is a diagram showing an example of an IC card 30 having the wireless communication device 1 according to the first to sixth embodiments. The IC card 30 of FIG. 14 has an IC chip 31 into which the wireless communication device 1 according to the first to fifth embodiments is incorporated, the first coil 6, and the first antenna 7 connected to the first wireless communication unit 4. When the second antenna 10 (see FIG. 5) separate from the first coil 6 is connected to the second wireless communication unit 9 in the wireless communication device 1, this second antenna 10 should also be incorporated into the IC card 30. However, in FIG. 14, the second antenna 10 is omitted. Further, the first antenna 7 may be incorporated into the IC chip 31.

Note that the shapes of the first antenna 7, second antenna 10, and first coil 6 should not be limited to those shown in FIG. 14, since these should be changed depending on the wireless communication band to be used. Further, the wireless communication device 1 may be formed not only of one IC chip 31 but of a plurality of IC chips 31. Furthermore, components forming the wireless communication device 1 may be partially realized as discrete parts, instead of being incorporated into the IC chip 31.

In the examples explained in the above embodiments, large-volume data is intermittently transmitted using the first wireless communication unit 4. However, it is not necessarily required to use the first wireless communication unit 4 when the data to be transmitted has a small volume and does not require to be transmitted at high-speed. Such data may be transmitted using the second wireless communication unit 9. That is, it is possible to arbitrarily select which one of the first wireless communication unit 4 and the second wireless communication unit should be used, depending on the data to be transmitted.

The configuration of the storage unit 3 in the above embodiments is not questioned as long as it is capable of storing power. For example, the storage unit 3 may be simply formed of a capacitor, or may have the functions of a regulator to control output voltage. Further, the storage unit 3 may be provided with a switch for switching between storing power in the storage unit 3 and discharging the power stored therein. Furthermore, the power stored in the storage unit 3 may be utilized in order to drive a peripheral device different from the wireless communication device 1. For example, a memory in a peripheral device may be driven using the power stored in the storage unit 3.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device, comprising:
a power receiving wireless communicator to receive power and perform wireless communication utilizing the power;
a storage to store a portion of the power received by the power receiving wireless communicator;
a first wireless communicator to perform wireless communication faster and more efficiently than the power receiving wireless communicator by utilizing the power stored in the storage, when an amount of the power stored in the storage unit exceeds a first reference level; and
a controller to generate a first trigger signal indicating that the amount of the power stored in the storage has exceeded the first reference level;
wherein the power receiving wireless communicator includes:
a power receiver to receive the power and supply the portion of the power to the storage; and
a second wireless communicator to perform wireless communication by utilizing the power received by the power receiver;
wherein the second wireless communicator transmits an RF signal including the first trigger signal; and
wherein the first wireless communicator starts wireless communication when the first trigger signal is supplied from the controller.

2. The device of claim 1, further comprising:
a first coil connected to the power receiver and capable of receiving an RF signal transmitted from a power transmitter through electromagnetic induction,
wherein the second wireless communicator receives the RF signal transmitted from the power transmitter through the first coil, and then generates a power modulated signal modulating the RF signal by utilizing a power of the RF signal and transmits the power modulated signal to the power transmitter through the first coil, and
the storage stores the portion of the power of the RF signal.

3. The device of claim 1, further comprising:
a first antenna connected to the first wireless communicator in order to receive an RF signal transmitted from a power transmitter and to transmit an RF signal to the power transmitter;
a first coil connected to the power receiver and capable of receiving an RF signal transmitted from the power transmitter through electromagnetic induction; and
a second antenna connected to the second wireless communicator in order to receive an RF signal transmitted from the power transmitter and to transmit an RF signal to the power transmitter.

4. The device of claim 1, wherein:
the controller generates a second trigger signal when the amount of the power stored in the storage has fallen below a second reference level,
the second wireless communicator transmits an RF signal including the second trigger signal generated by the controller, and
the first wireless communicator stops the fast and efficient wireless communication when the second trigger signal is supplied from the controller.

5. The device of claim 4, wherein the second wireless communicator is capable of continuously performing wireless communication while the first communicator stops the fast and efficient wireless communication.

6. The device of claim 1, further comprising:
a communication information retainer to retain at least one type of information selected from information for identifying the first wireless communicator, information concerning communication performance of the first wireless communicator, and standard correspondence information of the first wireless communicator,
wherein the first wireless communicator performs a connection process for connecting itself to a power transmitter, referring to the information retained by the communication information retainer, and wirelessly communicates with the power transmitter after the connection process is completed.

7. The device of claim 1, wherein the second wireless communicator performs a near field communication.

8. A power transmitter device to transmit power to a wireless communication device comprising a power receiving wireless communicator to receive power and perform wireless communication by using the power, a storage to store a portion of the power received by the power receiving wireless communicator, a first wireless communicator to perform wireless communication faster and more efficiently than the power receiving wireless communicator, a second wireless communicator to perform wireless communication slower and less efficiently than the first wireless communicator, and a controller to generate a first trigger signal indicating that an amount of the power stored in the storage unit has exceeded the first reference level, comprising:
a power transmitting wireless communicator to transmit power to the power receiving wireless communicator in the wireless communication device of claim 1 to wirelessly communicate with the power receiving wireless communicator; and
a third wireless communicator to perform fast and efficient wireless communication with the first wireless communicator when the power transmitting wireless communicator receives the first trigger signal,
wherein the power transmitting wireless communicator includes:
a power transmitter to wirelessly transmit power to the power receiver; and
a fourth wireless communicator to receive the first trigger signal while wirelessly communicating with the second wireless communicator slower and less efficiently than the third wireless communicator.

9. The power transmitter device of claim 8, further comprising:
a second coil connected to the power transmitter and capable of transmitting power through electromagnetic induction,
wherein the fourth wireless unit communicator wirelessly communicates with the second wireless communicator through the second coil.

10. The power transmitter device of claim 8, further comprising:
a third antenna connected to the third wireless communicator in order to receive an RF signal transmitted from the first wireless communicator and to transmit an RF signal to the first wireless communicator;
a second coil connected to the power transmitter and capable of transmitting power through electromagnetic induction; and
a fourth antenna connected to the fourth wireless communicator in order to receive an RF signal transmitted from the second wireless communicator and to transmit an RF signal to the second wireless communicator.

11. The power transmitter device of claim 8, wherein the fourth wireless communicator performs a near field communication with the second wireless communicator.

12. An IC card device, comprising:
at least one IC chip comprising: a power receiving wireless communicator to perform wireless communication utilizing power received thereby; a storage unit configured to store a portion of the power received by the power receiving wireless communicator; and a first wireless communicator to perform wireless communication faster and more efficiently than the power receiving wireless communicator by utilizing the power stored in the storage, when an amount of the power stored in the storage exceeds a first reference level; and a controller to generate a first trigger signal indicating that the amount of the power stored in the storage has exceeded the first reference level;
a first coil connected to the power receiving wireless communicator; and
a first antenna connected to the first wireless unit communicator,
wherein the power receiving wireless communicator includes:
a power receiver to receive power and supply the portion of the power to the storage; and
a second wireless communicator to perform wireless communication by utilizing the power received by the power receiver;
wherein the second wireless communicator transmits an RF signal including the first trigger signal; and
wherein the first wireless communicator starts wireless communication when the first trigger signal is supplied from the controller.

13. The device of claim 12, further comprising:
a first coil connected to the power receiver and capable of receiving an RF signal transmitted from a power transmitter through electromagnetic induction,
wherein the second wireless communicator receives the RF signal transmitted from the power transmitter through the first coil, and then generates a power modulated signal modulating the RF signal by utilizing a power of the RF signal and transmits the power modulated signal to the power transmitter through the first coil, and
the storage stores the portion of the power of the RF signal.

14. The device of claim 12, further comprising:
a first antenna connected to the first wireless communicator in order to receive an RF signal transmitted from a power transmitter and to transmit an RF signal to the power transmitter;
a first coil connected to the power receiver and capable of receiving an RF signal transmitted from the power transmitter through electromagnetic induction; and
a second antenna connected to the second wireless communicator in order to receive an RF signal transmitted from the power transmitter and to transmit an RF signal to the power transmitter.

15. The device of claim 12, wherein:
the controller generates a second trigger signal when the amount of the power stored in the storage has fallen below a second reference level,
the second wireless communicator transmits an RF signal including the second trigger signal generated by the controller, and
the first wireless communicator stops the fast and efficient wireless communication when the second trigger signal is supplied from the controller.

16. The device of claim 15, wherein the second wireless communicator is capable of continuously performing wireless communication while the first communicator stops the fast and efficient wireless communication.

17. The device of claim 12, further comprising:
a communication information retainer to retain at least one type of information selected from information for identifying the first wireless communicator, information concerning communication performance of the first wireless communicator, and standard correspondence information of the first wireless communicator,
wherein the first wireless communicator performs a connection process for connecting itself to a power transmitter, referring to the information retained by the communication information retainer, and wirelessly communicates with the power transmitter after the connection process is completed.

18. The device of claim 12, wherein the second wireless communicator performs a near field communication.

19. A wireless communication method, comprising:
receiving power by a power receiving wireless communicator to perform wireless communication utilizing the power;
storing a portion of the power received by the power receiving wireless communicator into a storage;
performing, by a first wireless communicator, wireless communication faster and more efficiently than the power receiving wireless communicator by utilizing the power stored in the storage, when amount of the power stored in the storage exceeds a first reference level; and
generating a first trigger signal showing that the amount of the power stored in the storage has exceeded the first reference level;
wherein the power receiving wireless communicator performs, by a second wireless communicator, wireless communication by utilizing the received power;
wherein the second wireless communicator transmits an RF signal including the first trigger signal; and
wherein the first wireless communicator starts wireless communication when the first trigger signal is supplied thereto.

* * * * *